United States Patent [19]

Watson

[11] 4,070,419
[45] * Jan. 24, 1978

[54] POLYMERIZATION OF STYRENE

[75] Inventor: James M. Watson, Big Spring, Tex.

[73] Assignee: Cosden Technology, Inc., Big Spring, Tex.

[ * ] Notice: The portion of the term of this patent subsequent to June 22, 1993, has been disclaimed.

[21] Appl. No.: 636,718

[22] Filed: Dec. 1, 1975

[51] Int. Cl.$^2$ .................. C08F 279/02; C08F 112/08; C08F 2/02
[52] U.S. Cl. ..................................... 260/879; 526/77; 526/236; 526/346
[58] Field of Search ............. 260/879 R; 526/77, 346, 526/236

[56] References Cited

U.S. PATENT DOCUMENTS

| | | | |
|---|---|---|---|
| 2,181,102 | 11/1939 | Stoesser et al. | 526/346 |
| 2,210,639 | 8/1940 | Stoesser | 526/346 |
| 2,225,471 | 12/1940 | Foord | 526/346 |
| 2,226,714 | 12/1940 | Foord | 526/346 |
| 2,412,504 | 12/1946 | Goldfinger | 526/77 |
| 3,964,979 | 6/1976 | Watson | 203/9 |

Primary Examiner—Alan Holler

[57] ABSTRACT

Disclosed is a process for the production of polystyrene which comprises the steps of contacting styrene monomer with gaseous nitric oxide (NO) and thereafter subjecting the styrene monomer to polymerization conditions. An advantageous increase in the rate of polymerization for the styrene results.

12 Claims, No Drawings

POLYMERIZATION OF STYRENE

BACKGROUND OF THE INVENTION

The present invention relates to a process for the production of polystyrene, and more especially, to a polymerization process for styrene monomer which results in an accelerated rate of polymerization.

In recent years the popularity of polystyrene has increased tremendously, particularly in view of more frequent use of this material in containers, in the automobile industry, in the toy industry, and in many other areas of commerce. One solution to the problem of producing an increasing supply of polystyrene is to enlarge plant size capacity for the production thereof; however, this solution has several disadvantages. For example, it involves an irreversible commitment of extremely large sums of capital and in addition, there exists always a lag of several years before the newly constructed plant capacity actually comes on stream.

A far better solution to the problem resides in means for improving the efficiency of existing plant capacity. In this way, the total annual production of polystyrene could be increased without the construction of new production lines. Most advantageously, the increase in production capacity for existing facilities should involve as little capital expenditure as possible. Accordingly, there exists today a significant need for means of increasing the annual production of polystyrene without incurring the expenses and/or delay of constructing new production facilities or the expenses of significantly modifying existing facilities.

SUMMARY OF THE INVENTION

It is, therefore, an object of the present invention to provide an improved process for the production of polystyrene.

A further object of the present invention resides in the provision of an improved process for producing polystyrene wherein existing polymerization facilities may be employed with little or no modification thereof.

It is also an object of the present invention to provide an improved process for the production of polystyrene wherein the improvement resides in an increase in the polymerization reaction rate for styrene monomer and does not require any further modificationsin the production facility.

In accomplishing the foregoing and other objects, there has been provided in accordance with the present invention a process for the production of polystyrene which comprises the steps of contacting styrene monomer with gaseous nitric oxide (NO), and thereafter subjecting the styrene monomer to polymerization conditions. In a preferred embodiment, the styrene monomer is contacted with an amount of gaseous nitric oxide ranging between about 25 and 500 ppm, and more preferably an amount between about 100 and 400 ppm, the treated styrene is subjected to a purification procedure wherein substantially all of the NO is removed and then the monomer is polymerized. In the step of contacting the styrene monomer with NO, it is advantageous to utilize a temperature corresponding to distillation temperatures of styrene monomer, for example between about 150° and 300° F. Most preferably, NO is brought into contact with the styrene monomer during the purification stages for the monomer, for example, under distillation conditions. Polymerization conditions may be either mass polymerization or suspension polymerization, and the process is applicable to the production of homopolystyrene as well as impact polystyrene.

Other objects, features and advantages of the present invention will become apparent from the following detailed description of preferred embodiments.

DETAILED DESCRIPTION OF PREFERRED EMBODIMENTS

The present invention is based upon the unexpected discovery that styrene monomer which has been brought into contact with gaseous nitric oxide (NO), for example, during purification of the styrene monomer by distillation, displays a higher rate of polymerization than does styrene monomer which has not been treated with NO. Under conventional conditions of polymerization for styrene monomer, there has been observed an increase in the rate of polymerization of between 5 and 15% when operating in accordance with the present invention. The advantages of this result are obvious, since the output of a given polymerization facility may be increased without further capital investment by employing the technique according to the present invention.

The advantages according to the invention may be realized by simply contacting styrene monomer with a relatively small amount of gaseous nitric oxide (NO) prior to subjecting the styrene monomer to polymerization conditions. It has been found, for example, that small amounts of NO between 1 and 5 ppm provide a demonstrable effect on the polymerization rate for polystyrene. This is an amount of NO which is sufficient to favorably effect the subsequent polymerization of the styrene without adversely inhibiting this polymerization.

In the preferred aspect of the present invention, the styrene monomer is contacted with a significantly larger amount of NO, for example, between about 25 and 500 ppm, or more preferably between about 100 and 400 ppm. The thus-contacted styrene is then subjected to purification conditions to remove substantially all of the NO, i.e., to decrease the NO content to a level below about 10 ppm and preferably below about 5 ppm.

The step of contacting NO with monomeric styrene may comprise any procedure for bringing the two materials into contact with one another. Typically the gaseous NO is simply permitted to bubble through the liquid monomeric styrene, although alternatively, the gaseous NO may be introduced into the vapor space above monomeric styrene in a storage container, provided that some means of agitation is provided to assure at least some mixing of the two substances. The gaseous NO may also be added to the styrene as the monomeric material is being transported through a pipe or the like.

The subsequent purification can be accomplished by any known method, such as absorption, adsorption, distillation or the like. In fact, the concentration of NO has a tendency to decrease in the styrene upon simply standing or any heating of the styrene. It is most conventional and therefore most preferred to purify the styrene by distillation techniques, e.g., at a temperature between about 150° and 300° F. and at a pressure between about 30 and 500 mm Hg for times generally between 2 and 4 hours.

In view of the relatively expensive nature of nitric oxide, it is preferred that the NO be brought into contact with styrene monomer during the course of a distillation purification procedure for the styrene, since it has been found that NO acts as an excellent polymerization inhibitor for styrene during the distillation process. In this way, a dual benefit is obtained from the use of nitric oxide. In such a distillation system, the temperature of the reboiler is generally maintained in the range of from about 150° to 250° F., the reboiler pressure is generally within the range of from about 30 to about 400 mm. of Hg, and the apparatus similarly contains between about 50 and 100 distillation stages. The gaseous NO may be introduced into the distillation apparatus in any convenient manner which permits efficient distribution of the inhibitor throughout the styrene monomer. Typically, the NO is injected into the reboiler area of the distillation column, although equivalent results may be obtained by injecting the NO into the incoming hot stream of styrene monomer. The use of gaseous nitric oxide as a polymerization inhibitor during the purification of styrene monomer by distillation is described more fully in my copending U.S. application, Ser. No. 531,202, filed on Dec. 9, 1974, now U.S. Pat. No. 3,964,979, the entire disclosure of which is hereby incorporated by reference.

Polymerization of the styrene monomers subsequent to contact with the gaseous nitric oxide may be carried out in accordance with any of the conventionally utilized polymerization processes. Polymerization may be carried out either as a mass process, a suspension process or an emulsion process, although the last mentioned is not frequently employed for the preparation of styrene polymer. One generally preferred process for the production of homopolystyrene involves the mass polymerization of styrene monomer, conducted either as a thermal polymerization or, more typically, utilizing a free radical initiator such as a peroxide, azo compound or the like. Homopolystyrene is also commonly prepared by means of suspension polymerization techniques. The details of particular polymerization systems do not form any part of the present invention, and reference is made to the following U.S. patents, the disclosures of which are hereby incorporated by reference, for more detailed information concerning conventional polymerization systems: U.S. Pat. Nos. 3,068,192 and 3,100,763.

The advantages of the present invention have likewise been found to result during the copolymerization of styrene monomer with minor amounts of one or more monomeric materials copolymerizable with the styrene, for example, not more than 10 or 15% of typical comonomers such as acrylonitrile, butadiene and the like. Similarly, the invention is applicable to the polymerization of styrene monomer in the presence of a rubbery material, such as a polydiene polymer or rubber, to produce a graft copolymer of styrene upon the rubbery backbone material. The products are conventionally referred to as impact polystyrenes. Copolymerization of styrene with minor amounts of other monomeric materials can be carried out in accordance with any of the conventional mass, suspension or emulsion polymerization techniques. Preparation of impact polystyrenes is typically accomplished by a combination of mass and suspension polymerization techniques. Typically, the polydiene compound is dissolved in styrene monomer and the solution is polymerized en masse, with or without catalyst, to a conversion of between about 5 and 40%. The partially polymerized liquid mass polymer is then converted to a suspension polymerization system, wherein polymerization is completed to form hard polymer beads. Further details of such a graft polymerization process may be found, for example, in U.S. Pat. No. 3,047,534. Conventional polydiene compounds include polybutadiene, butadiene-styrene copolymers, polyisoprene, polychloroprene, natural rubbers and the like. Polybutadiene rubbers, particularly those having high cis-1,4 content, are preferred.

In order to further illustrate the present invention, the following specific examples are provided with the understanding that they are intended to be illustrative and in no sense limitative.

EXAMPLE 1

700 ml of finished styrene are subjected to simple vacuum distillation to remove all t-butylcatechol. Four 50 gram samples are placed in pressure bottles, flushed with nitrogen gas and sealed as blank samples. The remainder of distilled styrene is treated with 1200 cc (250 ppm) of nitric oxide, then heated to 85° C. for approximately 15 minutes with the addition of a further 1200 cc of NO being added during the heat up period. The treated styrene is subsequently redistilled using a 6 in. vigreaux column, and the resulting product is weighed into pressure bottles in 50 gram aliquots. The bottles are flushed with nitrogen and sealed.

A pulsed oil bath is heated to 115° C., and three sample bottles and two blank bottles are placed therein. The pressure bottles are removed after an elapsed time period of one-half hour, and the experiment is repeated with a second set of five pressure bottles except that the elapsed time is permitted to extent to 1 hour. The contents of the pressure bottles are evaporated, and the percentage of polymer remaining after evaporation is measured. The nitric oxide-treated samples evidence an average of 7.33% polymer, whereas the blank samples show a polymerization of only 6.65% at the end of the half-hour period. After one hour elapsed time, the treated samples show a 22.13% degree of polymerization and the blank samples evidence a 19.60% degree of polymerization. This demonstrates an increase of between 10 and 13% in the rate of polymerization for the nitric oxide-treated styrene.

EXAMPLE 2

Two additional blank samples and two additional NO-treated samples are weighed out in the form of 15 gram samples and are sealed in pressure bottles. The pressure bottles are placed in an oil bath at 115° C. and permitted to remain therein for a period of 2 hours. The pressure bottles are removed from the oil bath and the polymer is isolated by precipitation in methanol followed by drying, in order to overcome the increased difficulty of evaporation with increasing polymer content. The average percent polymerization in the NO-treated samples is 40.1% and the average polymerization in the untreated blank samples is 38.3%. These results demonstrate an increase in polymerization rate of approximately 5% for the NO-treated styrene in comparison to the untreated samples.

EXAMPLE 3

Two 10 gram samples of untreated styrene and two 10 gram samples of NO-treated styrene are prepared and sealed in respective pressure bottles. The pressure bottles are placed in a thermostated oil bath at 115° C. and allowed to remain therein for a period of 5 hours. After 5 hours, 25 ml of dichloromethane are added to each pressure bottle to dissolve the contents thereof. After 15 minutes of continuous shaking, 2.0 grams of ortho-xylene are added to each bottle followed by 25 ml of methanol. The bottles are then agitated for another 15 minutes on a shaker. The resulting products are then analyzed for percentage of monomer content by GLC using ortho-xylene as a standard. The blank samples are found to contain an average of 37.75% monomer, and the NO-treated samples are found to contain an average of 34.65% monomer. These results illustrate a consistent acceleration of the polymerization reaction of approximately 5% for the NO-treated styrene as the polymerization reaction proceeds toward completion.

What is claimed is:

1. A process for the production of polystyrene, comprising the steps of
   a. contacting styrene monomer with gaseous nitric oxide (NO); and
   b. subjecting said styrene monomer to polymerization conditions, whereby said styrene polymerizes at an accelerated rate.

2. The process as defined by claim 1, wherein said styrene monomer is contacted with between 1 and 5 ppm of said nitric oxide (NO).

3. The process as defined by claim 1, further comprising the step of purifying said contacted styrene prior to polymerization, and wherein said styrene monomer is contacted with said nitric oxide (NO) in an amount of between about 25 and 500 ppm.

4. The process as defined by claim 3, wherein the amount of said nitric oxide (NO) is between about 100 and 400 ppm.

5. The process as defined by claim 3, wherein said step of purifying the contacted styrene comprises distillation.

6. The process as defined by claim 5, wherein said styrene monomer is contacted with said nitric oxide (NO) during said distillation.

7. The process as defined by claim 1, wherein said styrene monomer is subjected to mass polymerization conditions.

8. The process as defined by claim 5, wherein said polymerization is thermal polymerization.

9. The process as defined by claim 5, wherein said polymerization is conducted in the presence of a free-radical generating agent.

10. The process as defined by claim 1, wherein said polymerization conditions comprise polymerization of styrene to produce homopolystyrene.

11. The process as defined by claim 1, wherein said polymerization conditions comprise polymerization of styrene in the presence of a rubber material to produce impact polystyrene.

12. The process as defined by claim 1, wherein said styrene monomer is subjected to suspension polymerization conditions.

* * * * *